Figure 9:
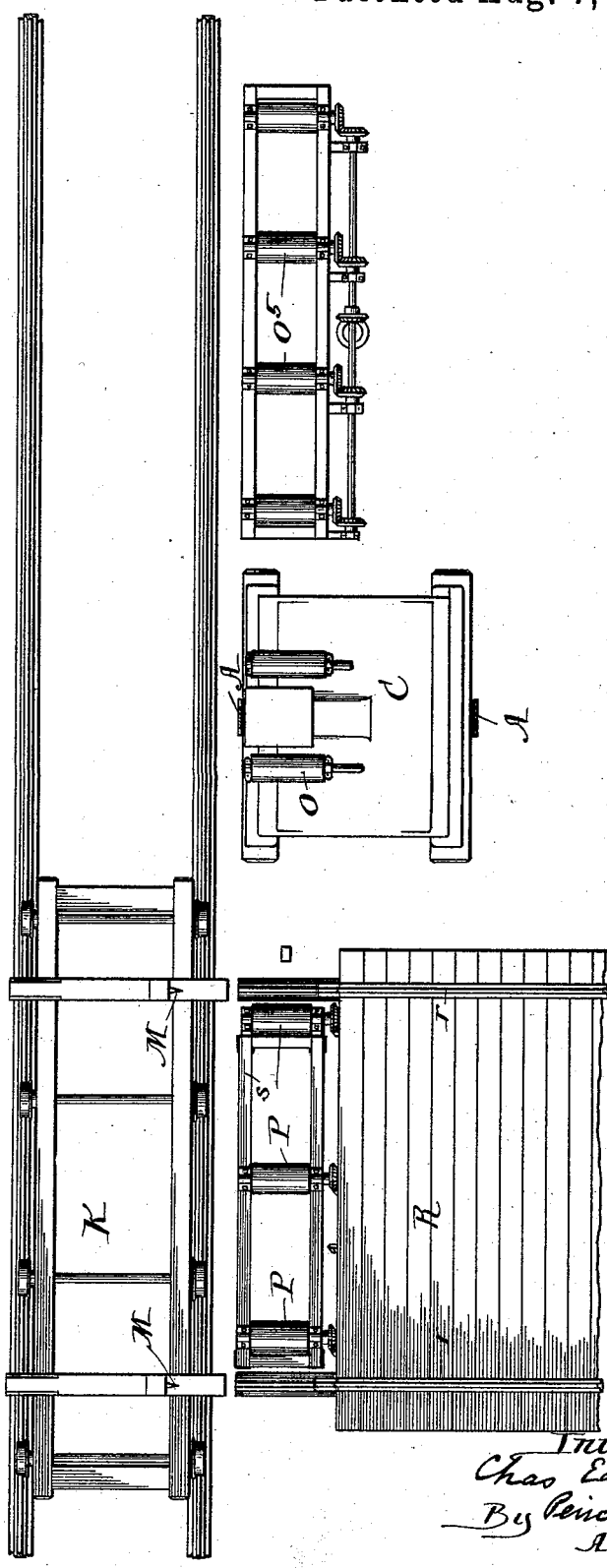

(No Model.)  3 Sheets—Sheet 1.
C. EDGAR.
SAWMILL.
No. 524,135. Patented Aug. 7, 1894.
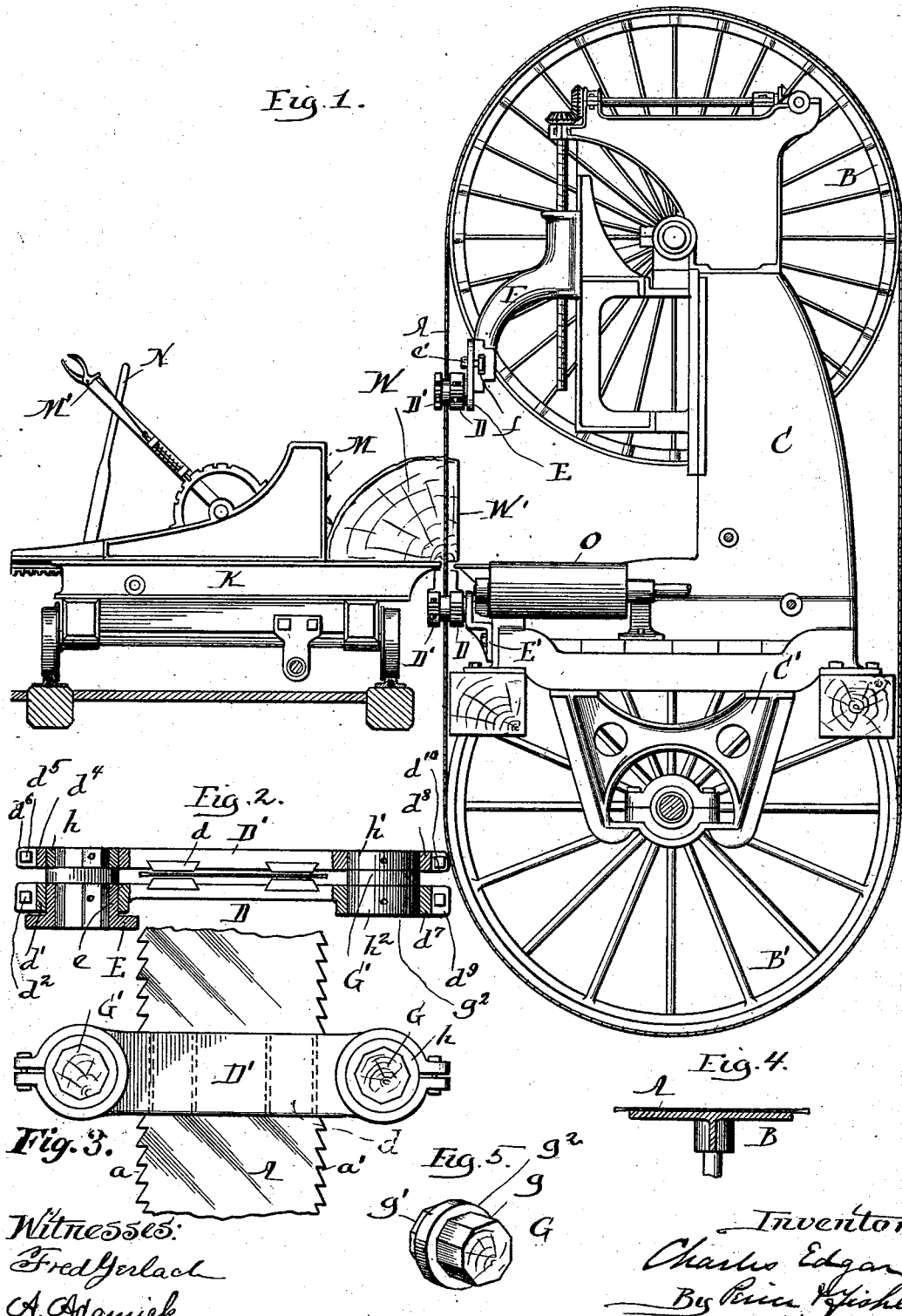
Witnesses:
Fred Gerlach
A. Adamick
Inventor:
Charles Edgar
By Pinn & Fisher
Attorneys

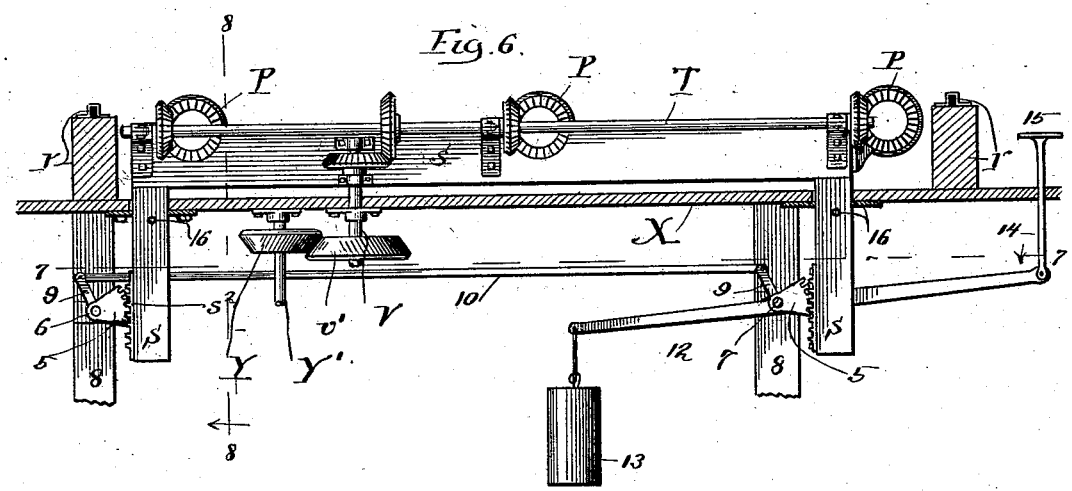

(No Model.) 3 Sheets—Sheet 3.

C. EDGAR.
SAWMILL.

No. 524,135. Patented Aug. 7, 1894.

Witnesses:
Fred Gerlach
Alberta Adamick

Inventor:
Chas Edgar
By Peirce & Fisher
Attorneys.

UNITED STATES PATENT OFFICE.

CHARLES EDGAR, OF WAUSAU, WISCONSIN.

SAWMILL.

SPECIFICATION forming part of Letters Patent No. 524,135, dated August 7, 1894.

Application filed December 22, 1893. Serial No. 494,386. (No model.)

*To all whom it may concern:*

Be it known that I, CHARLES EDGAR, a citizen of the United States, residing at Wausau, in the county of Marathon, State of Wisconsin, have invented certain new and useful Improvements in Sawmills, of which I do declare the following to be a full, clear, and exact description, reference being had to the accompanying drawings, forming part of this specification.

My invention has for its object to improve that class of saw mills whereby the cutting of the lumber is effected both on the forward and return movements of the carriage and to this end my invention consists in the various novel features hereinafter described, illustrated in the accompanying drawings and particularly pointed out in the claims at the end of this specification.

In the accompanying drawings I have shown only so much of a band saw mill as I regard necessary to the understanding of my invention and inasmuch as the mechanism whereby the log carriage is driven, and the logs are dogged and are set or fed into the path of the saw are the same as those heretofore commonly employed, I have not deemed it necessary to illustrate or describe this carriage mechanism in detail. Nor have I thought it necessary to show the mechanism for adjusting the band saw wheels or for cooling the guides of the saw, since these parts, as well as other features commonly employed in connection with band saws, will readily suggest themselves to the person skilled in this class of machines.

Figure 1 is an end view of so much of a band saw mill as is necessary to the comprehension of my invention, the log carriage, and the band saw, and its sustaining wheels and frame being shown in elevation. Fig. 2 is an enlarged detail view of one of the guides for the band saw. Fig. 3 is a view showing part of the band saw and one of the guides in side elevation. Fig. 4 is a view in cross section through the rim of one of the band saw wheels showing the saw thereon. Fig. 5 is a detail perspective view of one of the guard blocks used in the guide. Fig. 6 is a side view of a vertically movable frame for sustaining the "live" rolls at the foot of the log deck, and mechanism for driving said rolls. Fig. 7 is a view in horizontal section on line 7—7 of Fig. 6. Fig. 8 is a view in vertical section through the log deck and vertically movable frame carrying the "live" rolls, said section being taken on line 8—8 of Fig. 6. Fig. 9 is a diagrammatic view showing the relative arrangements of the live rolls for carrying off the cut lumber and their position with respect to adjacent parts.

A designates the band saw, the opposite edges of which are furnished with the teeth $a$ and $a'$. The saw A is carried by the upper and lower band wheels B and B', the toothed edges $a$ and $a'$ of the saw A projecting beyond the rims of the wheels B and B'. The bearing faces of these wheel rims are made narrower than the saw in order to avoid danger of contact with the swaged ends of the saw teeth. The band wheels B and B' are mounted upon shafts in usual manner, these shafts being sustained by means of a suitable frame having a column C for the upper wheel and suitable brackets C' for the lower wheel, as well understood in the art.

My improved guides comprise the side plates D and D' that extend across the opposite faces of the saw, these plates being by preference furnished with the inset bearing blocks $d$ of "Babbitt" metal to avoid friction (see Fig. 2). At one end of the plate D is formed a split sleeve $d'$ that encircles a hollow hub $e$ formed on the outer face of the lower end of a guide bar E, the sleeve $d'$ having lugs through which passes a bolt $d^2$ that serves to firmly clamp the sleeve on to the hub $e$ of the guide bar E. The guide bar E is connected to a guide arm F (of usual or suitable construction) by means of a bolt $e'$ that passes through this guide bar, the head of the bolt $e'$ entering a T-shaped slot $f$ formed in the lower end of the guide arm F. In the hollow hub $e$ of the guide bar E is set one end $g$ of a wooden block G and by preference the interior of the hub $e$ and the exterior of the end $g$ of the wooden block are of polygonal outline to guard against the turning of the block. Upon the opposite end $g'$ of the block G fits a metal sleeve or rim $h$ that is encircled by the split sleeve $d^4$ formed on the end of the guide plate D', the sleeve $d^4$ being clamped firmly on to the sleeve $h$ by a bolt $d^5$ that passes through the lugs $d^6$ of the sleeve. The opposite ends of the guide plates D and D' are provided with the split sleeves $d^7$ and $d^8$ having lugs $d^9$ and $d^{10}$ through which pass the bolts that serve to firmly clamp these sleeves onto rings $h'$ and $h^2$ that encircle a wooden guide block G' that extends between the outer ends of the guide plates D and D'. My purpose in thus extending the guide plates D and D' beyond both sides of the saw teeth is to insure a uniform bearing of the guides upon the saw blade during the times that each set of teeth is performing its work, and my object in providing the wooden blocks G and G' at the ends of the guide plates D and D' is not only to firmly sustain these plates but also to guard against danger of breaking the saw teeth in case they should contact with the blocks. Preferably the guide block G has a raised central portion $g^2$ as more particularly shown in Figs. 2 and 5 of the drawings. The lower guide for the saw will be substantially the same in construction as the upper guide above described but the bar E' that carries this lower guide will be preferably a bracket connected in the usual manner to the bed of the saw frame.

The carriage K whereby the logs or other lumber will be present to the action of the saw teeth may be of any suitable construction, one familiar type of such carriage being illustrated in the drawings. This carriage K is shown as comprising suitable trucks mounted upon a track in the usual manner and the forward and the return movement of the carriage will be effected by a steam actuated piston, a cable, or by any of the other well known forms of mechanism commonly employed for this purpose. The carriage K is equipped with the usual dogs M for engaging a log, these dogs being controlled in the usual manner by the hand-lever M' and the carriage is also furnished with some convenient form of set works operated by the lever N for advancing the log from time to time in order to present new portions to the action of the saw teeth. As the dogging mechanism and setting mechanism are both well known in the art, and form no part of my present invention I have not thought it necessary to illustrate the same in detail in the drawings.

From the construction of parts as thus far defined it will be seen that as the carriage K is moved in forward direction it will present the log W to the action of one set of cutting teeth $a$ thereby severing from the log a board W'. As soon as the forward movement of the carriage K is completed, the setter by means of the lever N will advance the log W a sufficient distance to present a portion of the log to the action of the set of saw teeth $a'$, and during the return or "gig" movement of the carriage, this second set of saw teeth $a'$ will sever a new board from the log. Thus it will be seen that at each forward and return movement of the carriage K a board is cut from the log W, thereby utilizing both movements of the carriage and by so much increasing the output of the mill.

Inasmuch as my improved mill provides for the cutting of the log during the return movement of the carriage, I prefer to provide "live" rolls whereby the boards severed from the log during this return movement may also be carried to the edger, and this feature of my invention is more particularly illustrated in Figs. 6, 7 and 8 of the drawings.

In band saw mills as ordinarily constructed the log deck is placed adjacent the saw frame and opposite that point from which the carriage starts at the beginning of the sawing operation. As the carriage during the return or "gig" movement comes opposite the log deck, it follows that when the log is cut during the return movement of the carriage, the board as thus severed from the log will drop at the foot of the log deck. I therefore place at the foot of the log deck a set of "live" rolls so that boards thus cut during the return or "gig" movement of the carriage can be carried forward to the edger in the same manner as the boards cut during the forward movement of the carriage.

Inasmuch as the arrangement of "live" rolls for carrying off the boards cut during the forward movement of the carriage is well understood I have not illustrated such arrangement in the drawings, but have simply shown in Fig. 1 that one of the "live" rolls commonly located adjacent the saw blade, and it will be understood that the "live" rolls leading from such point to the edger will be of usual arrangement. In front of the log deck however, I provide a series of "live" rolls P by which the boards cut from a log during the return movement of the carriage will be delivered to the "live" roll O adjacent the saw blade, whence they will pass by the usual rolls to the edger. In order to prevent the logs as they pass from the log deck striking the rolls P, I prefer to mount these rolls in a vertically movable frame so that when a log is to be transferred from the log deck to the carriage the "live" rolls P may be lowered below the line of the skids $r$ of the log deck R. The skids $r$ which are preferably T-rails suitably bent, extend down the face of the log deck R, being bent at $r'$ to extend across the horizontal space at the foot of the deck and to a point adjacent the path of travel of the log carriage K. The "live" rolls P are suitably journaled in the side bars $s$ of the vertically movable frame, these side bars being united to the vertical posts S that pass through slots or guide ways formed in the floor X of the mill. From end to end of the frame that carries the "live" rolls P extends a countershaft T having beveled pinions $t$ that engage with corresponding pinions $p$ formed on the shafts of the rolls P. On the shaft T is also a drive pinion $t'$ that meshes with a corresponding beveled pinion $v$ at the upper end of the drive shaft V that passes freely through an opening formed in the floor X of the mill, this shaft V being sustained by suitable bearings carried by the vertically movable frame. Upon the drive shaft V is mounted a cone wheel $v'$ that will engage a corresponding cone wheel Y mounted upon the fixed shaft $Y'$ that will be driven in usual manner from the source of power. Hence it will be seen that when the wheels $v'$ and Y are in contact motion will be transmitted through the pinions and the shaft T to the rolls P. When, however, the frame whereby the rolls P are sustained is depressed in order to bring these rolls below the line of the skid rails $r$, the cone wheels $v'$ and Y will be thrown out of engagement. In order to effect the raising and lowering of the shifting frame that carries the "live" rolls P, I prefer to employ the mechanism next to be described.

The vertical posts S are provided with rack bars $s^2$ with which engage segment gears 5 fixed to the rock shafts 6 and 7 that are suitably sustained, as for example by journal plates carried by the fixed posts 8 or any convenient fixed part of the structure. To each of the rock shafts 6 and 7 is fixed an arm 9, these arms being connected by a rod 10 to insure the unison movement of the shafts. Upon the rock shaft 7 is mounted a lever 12 one end of which carries a counter-weight 13 and to the opposite end of this lever is connected the rod 14 of the treadle 15, this treadle 15 being located in position adjacent the log deck so that when a log is to be rolled on to the carriage the operator can readily depress the treadle in order to effect the lowering of the "live" rolls P. The counter-weight 13 serves to normally hold the "live" rolls in the position shown in Figs. 6 and 7, the stop-pin 16 serving to limit the upward movement of the posts S, but it is obvious that when the weight of the operator is placed upon the treadle 15, the counter-weight 13 will be raised and the shifting frame with the "live" rolls P will be depressed below the level of the skids $r$ over which skids the logs will pass to the carriage. Hence it will be seen that during the return or "gig" movement of the carriage the board cut from the log will be delivered on to the "live" rolls P, which at such time will be in elevated position shown in the drawings, and by these rolls the board will be transferred to the rolls O adjacent the saw blade and will pass thence by the usual "live" rolls to the edger.

In Fig. 9 of the drawings the usual set of live rolls whereby the cut lumber is carried off to the edger is designated as $O^5$ and the construction and operation of these rolls will be readily understood by those familiar with this class of apparatus. During the forward movement of the log carriage the board will be cut and delivered on to the set of the live rolls $O^5$, while during the return movement of the carriage the cut board will be delivered on to the live rolls P and from these rolls the boards will be delivered to the rolls O (which are live rolls) and will be delivered by these rolls O on to the usual set of live rolls $O^5$.

Having thus described the invention, what I claim as new, and desire to secure by Letters Patent, is—

1. A band saw mill comprising the combination with a suitable carriage for the logs or lumber to be sawed and with two sets of saw teeth facing in opposite directions and supported and arranged to cut the logs or lumber as the carriage travels both forwardly and backwardly, of suitable guides comprising plates extending on each side of and beyond both sets of saw teeth and provided with bearing blocks intermediate the two sets of teeth and provided also with suitable wooden blocks interposed between the ends of said guide plates opposite the cutting edges of both sets of saw teeth and connected to the ends of said guide plates, substantially as described.

2. A band saw mill comprising the combination with a suitable carriage for the logs or lumber to be sawed and with two sets of teeth facing in opposite directions and supported and arranged to cut the logs or lumber as the carriage travels both forwardly and backwardly, of suitable guides comprising the plates D and D' extending on each side of and beyond both sets of saw teeth, said plates being provided with split sleeves and clamping bolts at their ends and suitable blocks extending across the space between said plates D and D' and engaged by said sleeves, substantially as described.

3. A saw mill comprising the combination with a suitable carriage for the logs or lumber to be sawed and with two sets of saw teeth facing in opposite directions and supported and arranged to cut the logs or lumber as the carriage travels both forwardly and backwardly, of a set of live rolls located at one side of and at the rear of the sets of saw teeth and opposite the path traversed by the carriage during the latter part of its backward movement, said live rolls being arranged to carry off the lumber cut by the saw teeth during the backward movement of the carriage, substantially as described.

4. A saw mill comprising a log deck, a set of live rolls at the foot of said log deck, skid rails extending from the foot of the log deck across the space wherein the live rolls are set, and suitable means whereby the relation of the skid rails to the live rolls may be changed so that normally the rails shall be below the line of the rolls, but will be above said rolls when a log is to be placed on the carriage, substantially as described.

5. A saw mill comprising a log deck, a set of vertically movable live rolls at the foot of said lock deck, suitable skid rails arranged to deliver the logs from the log deck to the carriage, and mechanism whereby said live rolls can be raised and lowered, substantially as described.

CHARLES EDGAR.

Witnesses:
GEO. P. FISHER, Jr.,
ALBERTA ADAMICK.